(12) United States Patent
Ludolph

(10) Patent No.: US 6,584,937 B1
(45) Date of Patent: Jul. 1, 2003

(54) PET TRANSPORT SYSTEM

(76) Inventor: Nancy L. Ludolph, 326 Wilson St. Unit 101, Hollywood, FL (US) 33019

( * ) Notice: Subject to any disclaimer, the term of this patent is extended or adjusted under 35 U.S.C. 154(b) by 0 days.

(21) Appl. No.: 10/103,938

(22) Filed: Mar. 22, 2002

(51) Int. Cl.[7] .............................................. A01K 31/07
(52) U.S. Cl. ...................................... 119/453; 119/500
(58) Field of Search ................................ 119/453, 496, 119/497, 500; 5/416; 280/47.371, 47.38

(56) References Cited

U.S. PATENT DOCUMENTS

| | | | | |
|---|---|---|---|---|
| 1,412,935 A | * | 4/1922 | Greenbaum .................... | 5/416 |
| 1,559,352 A | * | 10/1925 | Nelson .......................... | 5/416 |
| 1,770,841 A | * | 7/1930 | Clyman ......................... | 5/416 |
| 2,546,843 A | * | 3/1951 | Zigterman ..................... | 5/416 |
| 2,617,670 A | * | 11/1952 | Welsh ........................... | 5/416 |
| 2,735,716 A | * | 2/1956 | Shimabukuro ................. | 5/416 |
| 3,593,688 A | * | 7/1971 | Whitener ..................... | 119/453 |
| 4,010,888 A | * | 3/1977 | Gilbert ........................ | 119/457 |
| D246,518 S | | 11/1977 | Maclaren | |
| 4,116,465 A | | 9/1978 | Maclaren | |
| 4,349,210 A | | 9/1982 | Rutt | |
| 5,113,793 A | * | 5/1992 | Leader et al. ................ | 119/453 |
| 5,277,148 A | | 1/1994 | Rossignol et al. | |
| 5,330,253 A | * | 7/1994 | Kaneko .................... | 280/47.38 |
| 5,577,646 A | * | 11/1996 | White ........................ | 119/453 |
| 5,887,436 A | * | 3/1999 | Duddleston ................. | 119/500 |
| 5,988,110 A | * | 11/1999 | Peterson .................... | 119/453 |
| 6,027,137 A | * | 2/2000 | Rura ....................... | 280/47.38 |
| 6,142,100 A | * | 11/2000 | Marchioro ................. | 119/454 |
| 6,374,775 B1 | * | 4/2002 | Baumsteiger ............... | 119/496 |

FOREIGN PATENT DOCUMENTS

DE          3832774 A1  *  2/1990  ............. B62B/5/06

* cited by examiner

Primary Examiner—Charles T. Jordan
Assistant Examiner—Joan M. Olszewski

(57) ABSTRACT

A pet transport system for taking small and vulnerable pets on outings. The pet transport system includes a carriage portion designed for holding a small animal, the carriage portion includes a bottom wall and four side walls extending upwardly from the bottom wall; a wheeled portion for rolling the system along a surface such as the ground, the wheeled portion is coupled to the bottom wall; a canopy portion coupled to at least one side wall of the carriage portion, the canopy portion provides shade for the animal; and a handle portion coupled to the carriage portion, the handle portion is coupled to the carriage portion, the handle portion facilitating pushing the system.

8 Claims, 3 Drawing Sheets

PET TRANSPORT SYSTEM

BACKGROUND OF THE INVENTION

1. Field of the Invention

The present invention relates to pet carriers and more particularly pertains to a new pet transport system for taking small and vulnerable pets on outings.

2. Description of the Prior Art

The use of pet carriers is known in the prior art. More specifically, pet carriers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,113,793; U.S. Pat. No. 6,027,137; U.S. Pat. No. 4,116,465; U.S. Pat. No. 5,277,148; U.S. Pat. No. 5,577,646; U.S. Pat. No. 4,349,210; and U.S. Pat. No. Des. 246,518.

While these devices fulfill their respective, particular objectives and requirements, the aforementioned patents do not disclose a new pet transport system. The inventive device includes a carriage portion designed for holding a small animal, the carriage portion includes a bottom wall and four side walls extending upwardly from the bottom wall; a wheeled portion for rolling the system along a surface such as the ground, the wheeled portion is coupled to the bottom wall; a canopy portion coupled to at least one side wall of the carriage portion, the canopy portion provides shade for the animal; and a handle portion coupled to the carriage portion, the handle portion is coupled to the carriage portion, the handle portion facilitating pushing the system.

In these respects, the pet transport system according to the present invention substantially departs from the conventional concepts and designs of the prior art, and in so doing provides an apparatus primarily developed for the purpose of taking small and vulnerable pets on outings.

SUMMARY OF THE INVENTION

In view of the foregoing disadvantages inherent in the known types of pet carriers now present in the prior art, the present invention provides a new pet transport system construction wherein the same can be utilized for taking small and vulnerable pets on outings.

The general purpose of the present invention, which will be described subsequently in greater detail, is to provide a new pet transport system apparatus and method which has many of the advantages of the pet carriers mentioned heretofore and many novel features that result in a new pet transport system which is not anticipated, rendered obvious, suggested, or even implied by any of the prior art pet carriers, either alone or in any combination thereof.

To attain this, the present invention generally comprises a carriage portion designed for holding a small animal, the carriage portion includes a bottom wall and four side walls extending upwardly from the bottom wall; a wheeled portion for rolling the system along a surface such as the ground, the wheeled portion is coupled to the bottom wall; a canopy portion coupled to at least one side wall of the carriage portion, the canopy portion provides shade for the animal; and a handle portion coupled to the carriage portion, the handle portion is coupled to the carriage portion, the handle portion facilitating pushing the system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet transport system apparatus and method which has many of the advantages of the pet carriers mentioned heretofore and many novel features that result in a new pet transport system which is not anticipated, rendered obvious, suggested, or even implied by any of the prior art pet carriers, either alone or in any combination thereof.

It is another object of the present invention to provide a new pet transport system which may be easily and efficiently manufactured and marketed.

It is a further object of the present invention to provide a new pet transport system which is of a durable and reliable construction.

An even further object of the present invention is to provide a new pet transport system which is susceptible of a low cost of manufacture with regard to both materials and labor, and which accordingly is then susceptible of low prices of sale to the consuming public, thereby making such pet transport system economically available to the buying public.

Still yet another object of the present invention is to provide a new pet transport system which provides in the apparatuses and methods of the prior art some of the advantages thereof, while simultaneously overcoming some of the disadvantages normally associated therewith.

Still another object of the present invention is to provide a new pet transport system for taking small and vulnerable pets on outings.

Yet another object of the present invention is to provide a new pet transport system which includes a carriage portion designed for holding a small animal, the carriage portion includes a bottom wall and four side walls extending upwardly from the bottom wall; a wheeled portion for rolling the system along a surface such as the ground, the wheeled portion is coupled to the bottom wall; a canopy portion coupled to at least one side wall of the carriage portion, the canopy portion provides shade for the animal; and a handle portion coupled to the carriage portion, the handle portion is coupled to the carriage portion, the handle portion facilitating pushing the system.

Still yet another object of the present invention is to provide a new pet transport system that protects small animals from attacks from stray dogs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
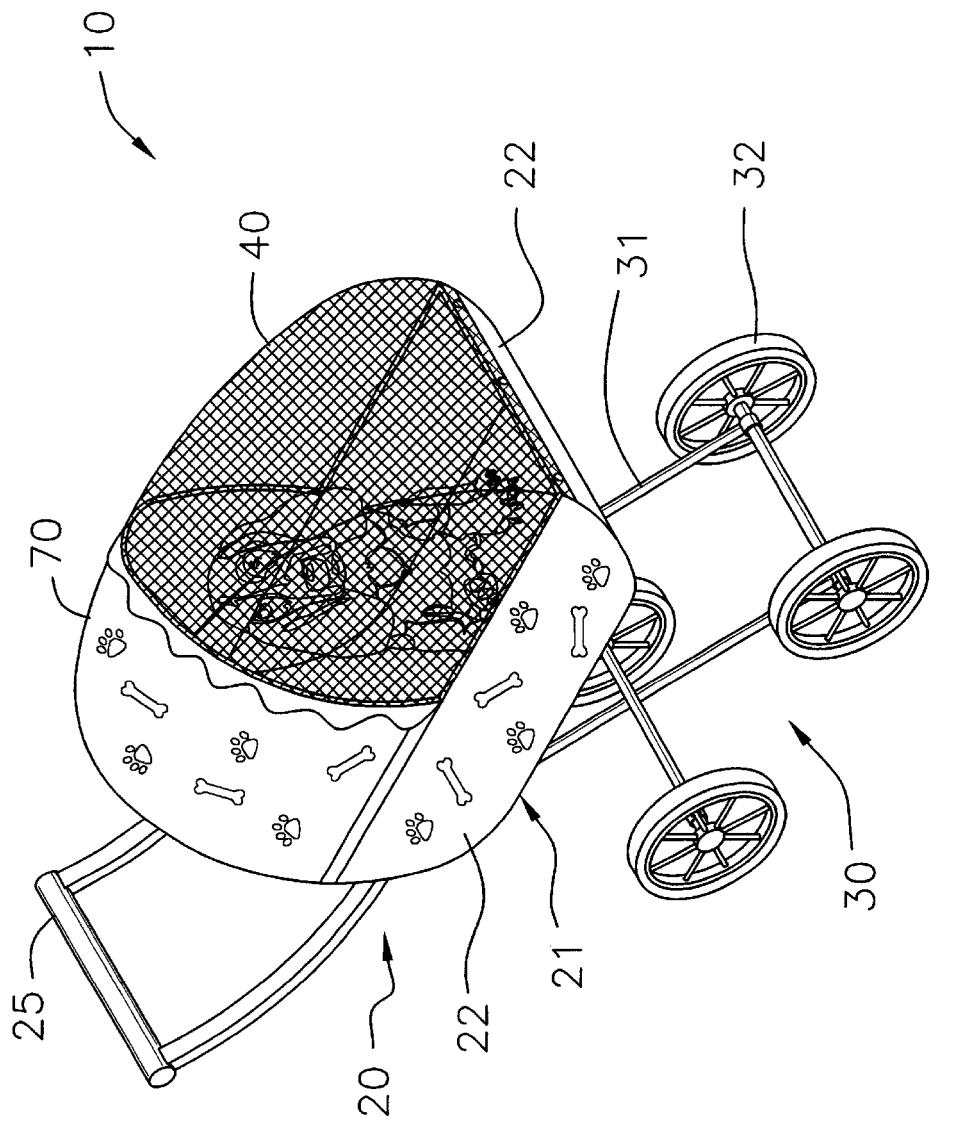
FIG. 1 is a schematic perspective view of a new pet transport system according to the present invention.
Figure 2:
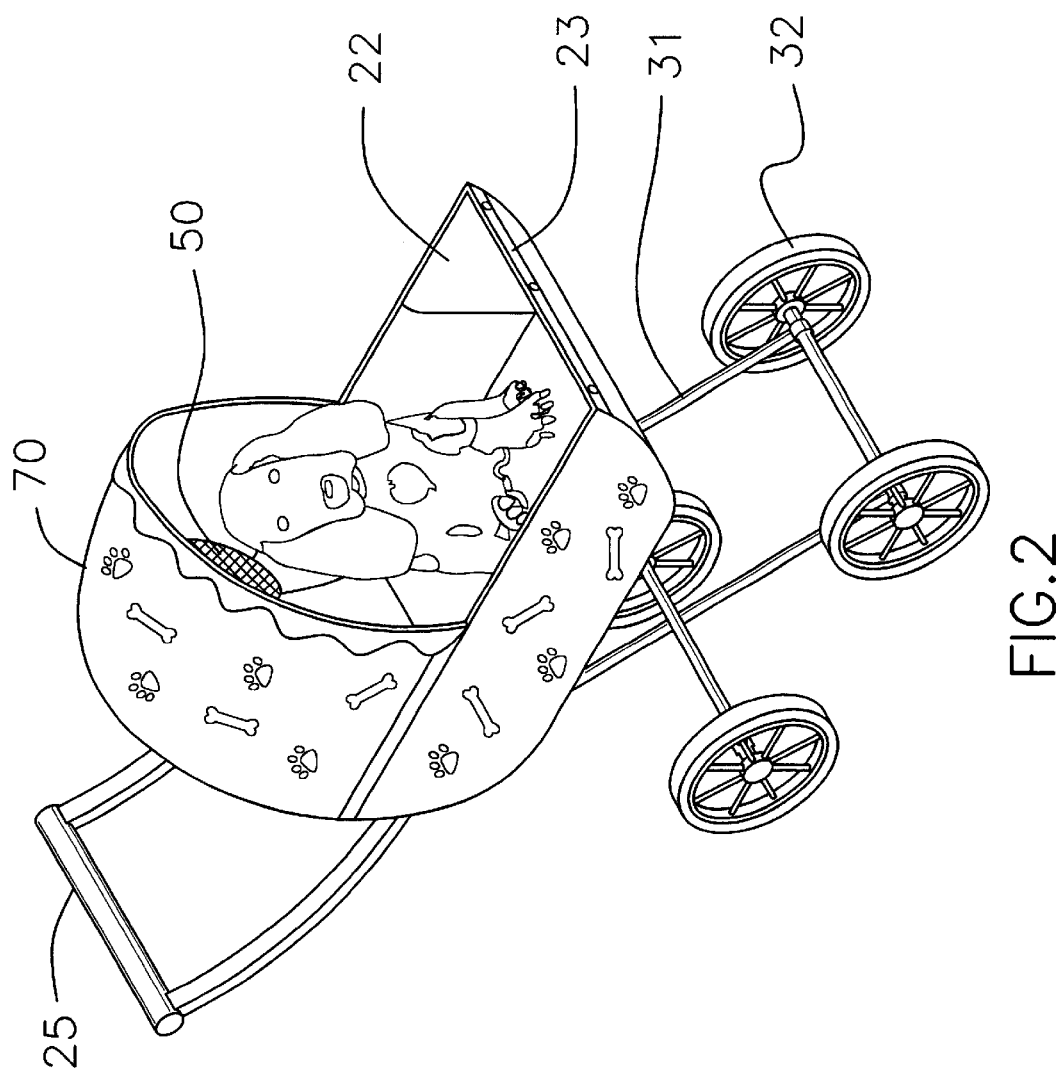
FIG. 2 is a schematic perspective view of the present invention with the scissors mechanism in the extended position.
Figure 3:
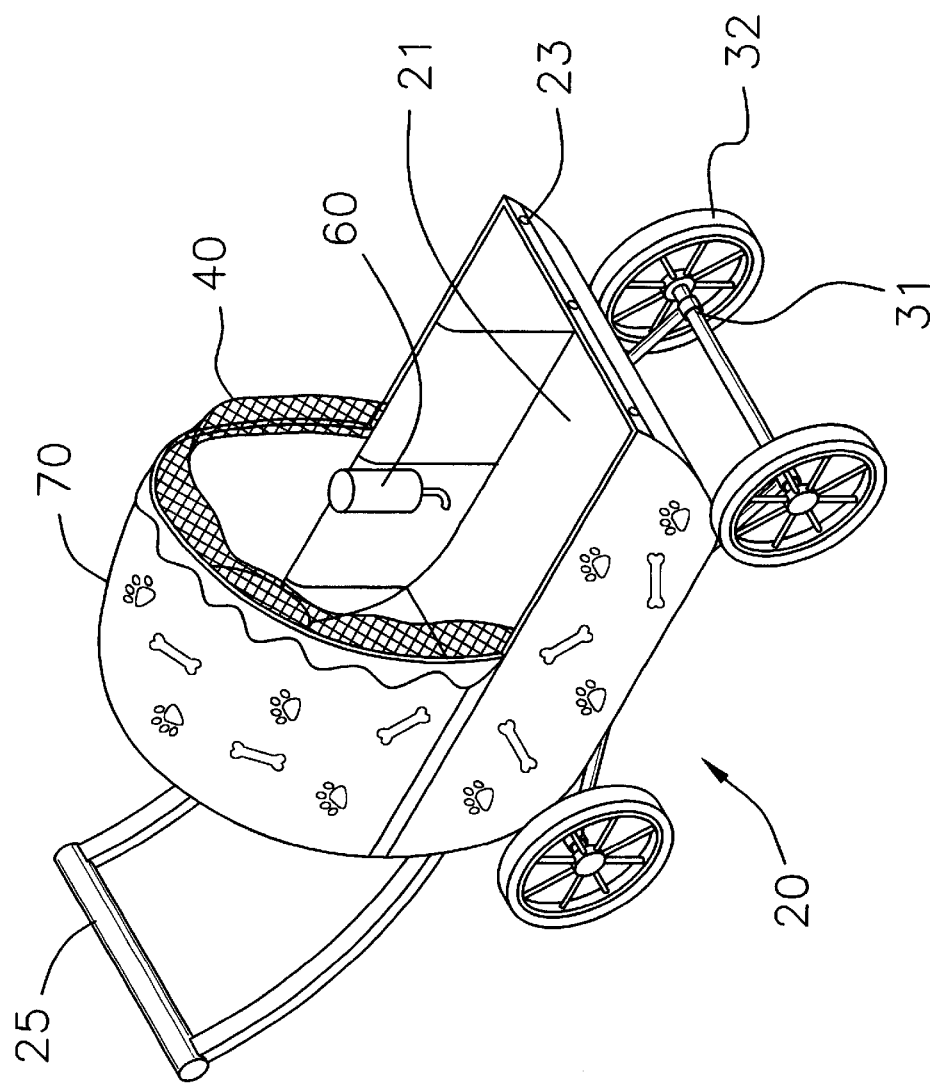
FIG. 3 is a schematic perspective view of the present invention with the scissors mechanism in the extended position.

With reference now to the drawings, and in particular to FIGS. 1 through 3 thereof, a new pet transport system embodying the principles and concepts of the present invention and generally designated by the reference numeral 10 will be described.

As best illustrated in FIGS. 1 through 3, the pet transport system 10 generally comprises a carriage portion 20, wheeled portion 30, and canopy portion 70.

The carriage portion 20 is designed for holding a small animal and is substantially bite-proof. The carriage portion 20 includes a bottom wall 21. The carriage portion 20 also includes four side walls 22, each of which extend upwardly from the bottom wall 21.

The wheeled portion 30 is for rolling the system 10 along a surface such as the ground. The wheeled portion 30 is coupled to the bottom wall 21.

The canopy portion 70 is preferably coupled to at least one side wall 22 of the carriage portion 20. The canopy portion 70 provides shade for the animal.

A handle portion 25 is coupled to the carriage portion 20. The handle portion 25 facilitates pushing the system 10.

A magnetic member 23 may be coupled to at least one side wall 22 of the carriage portion 20. A mesh member 40 is used for covering an opening. The mesh member 40 preferably comprises a ferrous material. The mesh member 40 is coupled to the carriage portion 20 by the magnetic member 23. The mesh member 40 is for protecting the small animal from other animals. The mesh member 40 allows the small animal to see out of the carriage 20.

A fan 50 is included for moving air through the carriage portion 20. The fan 50 is preferably-coupled to the canopy portion 70. The fan 50 is for reducing heat stress on the animal.

A water bottle 60 may also be coupled to an interior surface of the carriage portion 20. The water bottle 60 provides water for the animal during use.

The mesh member 40 is substantially flexible such that the mesh member 40 can be rolled up against the canopy member 70. The mesh member 40 is rollable to facilitate placing the animal into the carriage portion 20.

In an embodiment, the wheeled portion 30 further comprises a scissors mechanism 31 and a plurality of wheels 32. Preferably, the scissors mechanism 31 is coupled to the bottom wall 21 of the carriage portion 20. The plurality of wheels 32 is coupled to a lower end of the scissors mechanism 31. The wheels 32 facilitate rolling the carriage portion 20 across a surface.

The scissors mechanism 31 has an extended position for facilitating use by an adult. The scissors mechanism 31 also has a collapsed position for facilitating use by a child. The extended position places the carriage portion 20 at a first height. The collapsed position places the carriage portion 20 at a second height. The first height is substantially greater than the second height.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet transport system for use with small and vulnerable pets, comprising:

a carriage portion adapted for holding a small animal, said carriage portion having a bottom wall, said carriage portion having four side walls extending upwardly from said bottom wall;

a wheeled portion for rolling said system along a surface such as the ground, said wheeled portion being coupled to said bottom wall;

a canopy portion coupled to at least one side wall of said carriage portion, said canopy portion providing shade for the animal;

a handle portion coupled to said carriage portion, said handle portion facilitating pushing said system; and a magnetic member coupled to at least one side wall of said carriage portion;

a mesh member for covering an opening, said mesh member comprising a ferrous material, said mesh member being coupled to said carriage portion by said magnetic member, said mesh member being for protecting the small animal from other animals, said mesh member allowing the small animal to see out of the carriage.

2. The system of claim 1, further comprising a fan for moving air through said carriage portion, said fan being coupled to said canopy portion, said fan being for reducing heat stress on the animal.

3. The system of claim 1, further comprising a water bottle coupled to an interior surface of said carriage portion, said water bottle providing water for the animal during use.

4. A pet transport system for use with small and vulnerable pets, comprising:

a carriage portion adapted for holding a small animal, said carriage portion having a bottom wall, said carriage portion having four side walls extending upwardly from said bottom wall;

a wheeled portion for rolling said system along a surface such as the ground, said wheeled portion being coupled to said bottom wall;

a canopy portion coupled to at least one side wall of said carriage portion, said canopy portion providing shade for the animal;

a handle portion coupled to said carriage portion, said handle portion facilitating pushing said system;

a magnetic member coupled to at least one side wall of said carriage portion;

a mesh member for covering an opening, said mesh member comprising a ferrous material said mesh member being coupled to said carriage portion by said magnetic member, said mesh member being for protecting the small animal from other animals, said mesh member allowing the small animal to see out of the carriage;

a fan for moving air through said carriage portion, said fan being coupled to said canopy portion, said fan being for reducing heat stress on the animal;

a water bottle coupled to an interior surface of said carriage portion, said water bottle providing water for the animal during use.

5. The system of claim 4, wherein said mesh member being substantially flexible such that said mesh member can be rolled up against said canopy member, said mesh member being rollable to facilitate placing the animal into the carriage portion.

6. The system of claim 4, wherein said wheeled portion further comprises:

a scissors mechanism coupled to the bottom wall of the carriage portion;

a plurality of wheels coupled to a lower end of said scissors mechanism, said wheels facilitating rolling said carriage portion across a surface.

7. The system of claim 6, wherein said scissors mechanism having an extended position for facilitating use by an adult, said scissors mechanism having a collapsed position for facilitating use by a child, said extended position placing said carriage portion at a first height, said collapsed position placing said carriage portion at a second height, said first height being substantially greater than said second height.

8. The system of claim 4, further comprising:

said mesh member being substantially flexible such that said mesh member can be rolled up against said canopy member, said mesh member being rollable to facilitate placing the animal into the carriage portion;

said wheeled portion further comprises:

a scissors mechanism coupled to the bottom wall of the carriage portion;

a plurality of wheels coupled to a lower end of said scissors mechanism, said wheels facilitating rolling said carriage portion across a surface;

said scissors mechanism having an extended position for facilitating use by an adult, said scissors mechanism having a collapsed position for facilitating use by a child, said extended position placing said carriage portion at a first height, said collapsed position placing said carriage portion at a second height, said first height being substantially greater than said second height.

* * * * *